United States Patent
Zhu et al.

(10) Patent No.: US 12,475,034 B2
(45) Date of Patent: Nov. 18, 2025

(54) RESPONSE CONTROL IN MEMORY SYSTEMS FOR REDUCING INTERRUPT OVERHEAD

(71) Applicant: Yangtze Memory Technologies Co., Ltd., Hubei (CN)

(72) Inventors: Feifei Zhu, Wuhan (CN); Yaping Zhang, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 41 days.

(21) Appl. No.: 18/399,598

(22) Filed: Dec. 28, 2023

(65) Prior Publication Data

US 2025/0094332 A1 Mar. 20, 2025

Related U.S. Application Data

(63) Continuation of application No. PCT/CN2023/119983, filed on Sep. 20, 2023.

(51) Int. Cl.
*G06F 12/02* (2006.01)
*G06F 3/06* (2006.01)

(52) U.S. Cl.
CPC ........ *G06F 12/0246* (2013.01); *G06F 3/0659* (2013.01); *G06F 3/0679* (2013.01)

(58) Field of Classification Search
CPC .. G06F 12/0246; G06F 3/0679; G06F 3/0659; G06F 3/061; G06F 2212/7201; G06F 13/1673
See application file for complete search history.

(56) References Cited

U.S. PATENT DOCUMENTS

| | | | |
|---|---|---|---|
| 10,509,590 B2 | 12/2019 | Choi et al. | |
| 2014/0379921 A1* | 12/2014 | Morley | H04L 41/0895 709/226 |
| 2016/0132237 A1 | 5/2016 | Jeong et al. | |
| 2017/0075834 A1* | 3/2017 | Cha | G06F 3/0655 |
| 2019/0121540 A1* | 4/2019 | Shin | G06F 13/126 |
| 2021/0042039 A1* | 2/2021 | Benisty | G06F 13/20 |
| 2022/0101875 A1* | 3/2022 | Harllee | G11B 5/012 |
| 2022/0244856 A1* | 8/2022 | Kataria | G06F 11/2074 |
| 2023/0195475 A1* | 6/2023 | Basso | G06F 3/0644 |

(Continued)

FOREIGN PATENT DOCUMENTS

| | | | |
|---|---|---|---|
| TW | 201939285 A | 10/2019 | |
| TW | 202032360 A | 9/2020 | |

(Continued)

OTHER PUBLICATIONS

International Search Report in International Appln. No. PCT/CN2023/119983, mailed on Mar. 1, 2024, 4 pages.

(Continued)

*Primary Examiner* — Tasnima Matin
(74) *Attorney, Agent, or Firm* — Fish & Richardson P.C.

(57) ABSTRACT

Example memory systems, methods, and media for aggregating responses from memory systems to mitigate interrupt overhead in hosts coupled to the memory systems are disclosed. One example method includes receiving multiple commands from a host. Multiple responses are sent to the host at a time instant, where each of the responses is generated in a memory system during a time period and responsive to a respective one of the commands.

15 Claims, 6 Drawing Sheets

(56) References Cited

U.S. PATENT DOCUMENTS

| | | | | |
|---|---|---|---|---|
| 2024/0069807 A1* | 2/2024 | Halaharivi | ............... | G06F 3/061 |
| 2024/0231686 A1* | 7/2024 | Cheng | ................... | G06F 3/0673 |
| 2024/0345727 A1* | 10/2024 | He | ........................ | G06F 3/0659 |
| 2024/0345950 A1* | 10/2024 | Yuan | ................... | G06F 12/0246 |
| 2025/0013572 A1* | 1/2025 | Jabreva | ............... | G06F 12/0855 |

FOREIGN PATENT DOCUMENTS

| | | |
|---|---|---|
| TW | 202141267 A | 11/2021 |
| TW | 202225968 A | 7/2022 |

OTHER PUBLICATIONS

Jedec.org [online], "Universal Flash Storage (UFS), Version 2.1," Mar. 1, 2016, retrieved on Mar. 15, 2024, retrieved from URL <https://www.jedec.org/document_search?search_api_views_fulltext-jesd220c>, 2 pages.

Office Action in Taiwanese Appln. No. 113129456, mailed on Dec. 31, 2024, 19 pages (with English machine translation).

Office Action in Taiwanese Appln. No. 113129456, mailed on Mar. 26, 2025, 9 pages (with machine translation).

\* cited by examiner

RESPONSE CONTROL IN MEMORY SYSTEMS FOR REDUCING INTERRUPT OVERHEAD

CROSS-REFERENCE TO RELATED APPLICATIONS

This application is a continuation of International Application No. PCT/CN2023/119983, filed on Sep. 20, 2023, the disclosure of which is hereby incorporated by reference in its entirety.

TECHNICAL FIELD

The present disclosure relates to memory devices, memory systems, and methods for response control in memory systems.

BACKGROUND

A memory system can include one or more memory devices and a memory controller that manages the data stored in the one or more memory devices and communicates with a host. The host can send commands, for example, read or write commands, to the memory system to read data from or write data to the one or more memory devices. The memory system can generate corresponding responses and send the responses to the host. The host can use interrupts to handle the responses received from the memory system.

SUMMARY

The present disclosure relates to memory systems, methods, and media for aggregating responses from memory systems to mitigate interrupt overhead in hosts coupled to the memory systems. One example method includes receiving multiple commands from a host. Multiple responses are sent to the host at a time instant, where each of the responses is generated in a memory system during a time period and responsive to a respective one of the commands.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

This specification relates to memory systems, methods, and controllers for aggregating responses in memory systems to mitigate interrupt overhead in hosts coupled to the memory systems. In some cases, a host coupled to a memory system sends a read or write command to the memory system and receives a corresponding response from the memory system. The memory system can generate a respective response for each command sent by the host. The host can use an interrupt to handle a response sent by the memory system. If the host sends many commands, for example, random write commands, to the memory system within a short time period, the memory system may send back many responses within a short period of time, and each response may result in an interrupt used by the host to handle data that are associated with the response and have small chunk size, for example, less than 4 k bits. The responses can lead to a large number of interrupts in the host within the short period of time in order to handle the responses with associated data having small chunk sizes. The interrupts can result in large interrupt overhead in the host.

To mitigate the host interrupt overhead associated with large number of memory system responses especially those with associated data having small chunk sizes, the memory system can aggregate multiple responses within a period of time and then send the aggregated responses at once to the host, instead of sending one response at a time. Sending aggregated responses at once from the memory system to the host can reduce the number of interrupts that the host uses to handle the responses, and therefore mitigate the interrupt overhead in the host, independent of whether the host has its own schemes for mitigating the interrupt overhead. Sending aggregated responses at once from the memory system to the host can also reduce the number of times that the memory system sends responses to the host, and consequently reduce the overhead associated with the input/output operations between the host and the memory system.

Figure 1:
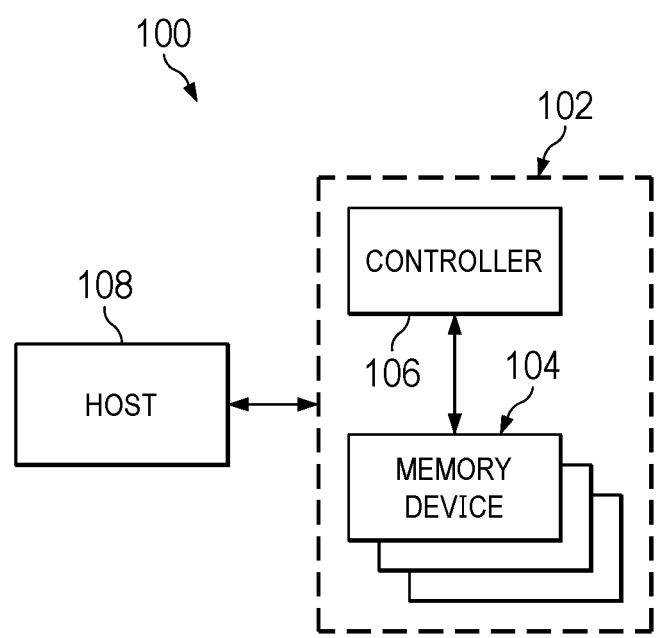
FIG. 1 illustrates a block diagram of an example system having a memory device, according to some aspects of the present disclosure.

FIG. 1 illustrates a block diagram of an example system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory devices 104 and a memory controller 106. Host 108 can include a processor of an electronic device, such as a central processing unit (CPU), or a system-on-chip (SoC), such as an application processor (AP). Host 108 can be configured to send or receive data to or from memory devices 104.

Memory device 104 can be any memory device disclosed in the present disclosure. Memory controller 106 is coupled to memory device 104 and host 108 and is configured to control memory device 104, according to some implementations. Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment SSDs or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations. Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error correction codes (ECCs) with respect to the data read from or written to memory device 104. Any other suitable functions may be performed by memory controller 106 as well, for example, formatting memory device 104.

Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Memory controller 106 and one or more memory devices 104 can be integrated into various types of storage devices, for example, be included in the same package, such as a universal Flash storage (UFS) package or an eMMC package. That is, memory system 102 can be implemented and packaged into different types of end electronic products.

Figure 2:
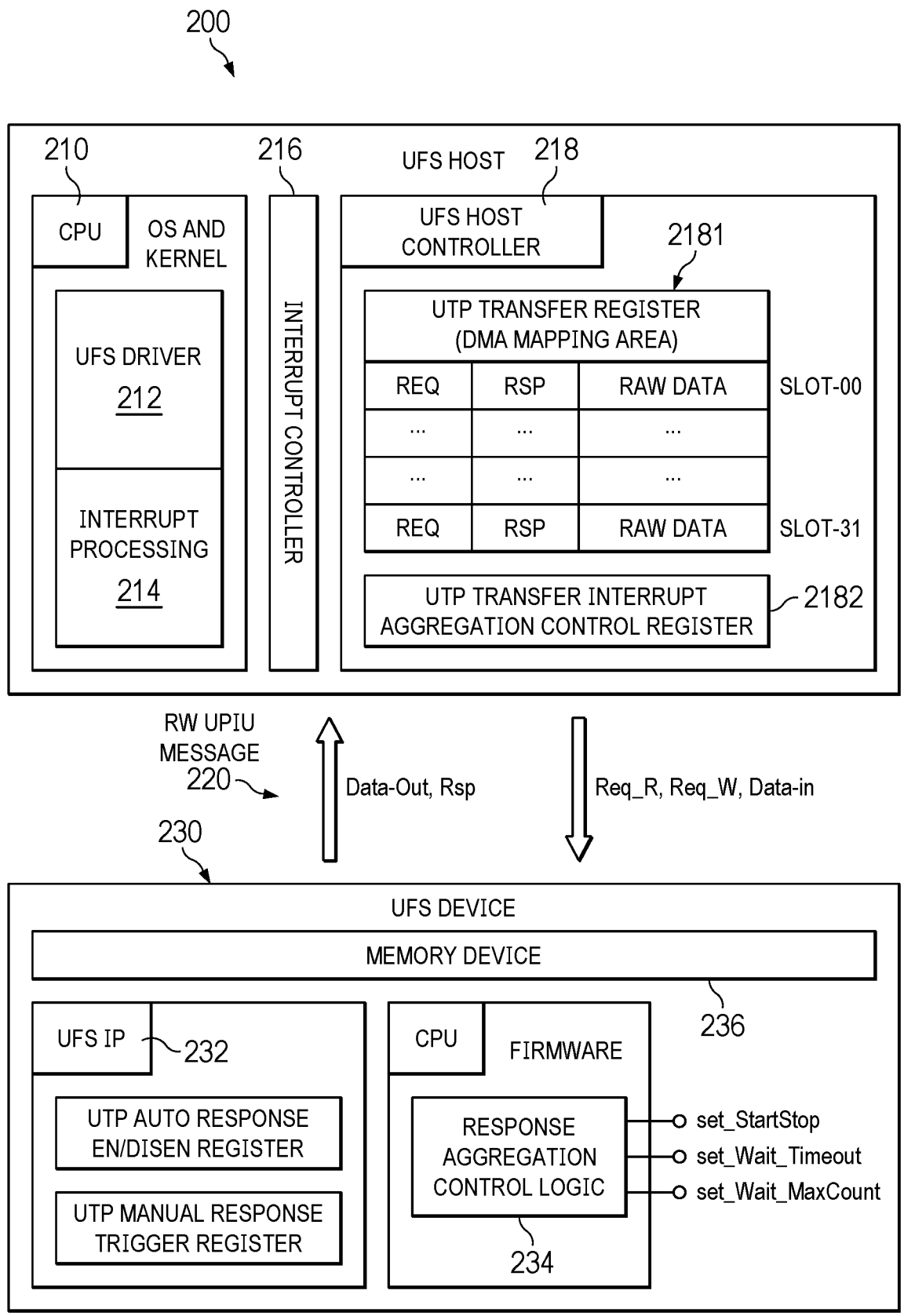
FIG. 2 illustrates an example system that includes a universal flash storage (UFS) host and a UFS device, according to some aspects of the present disclosure.

FIG. 2 illustrates an example system 200 that includes a UFS host 210 and a UFS device 230. System 200 is an example of system 100 in FIG. 1, UFS host 210 is an example of host 108 in FIG. 1, and UFS device 230 is an example of memory system 102 in FIG. 1. Read/write (RW) UFS protocol information unit (UPIU) messages 220 are packets in UPIU data structure format and can be used to transmit commands, data, and responses between UFS host 210 and UFS device 230.

In some implementations, UFS host 210 sends a read command (e.g., req_r in RW UPIU message 220) or a write command (e.g., req_w in RW UPIU message 220) to UFS device 230 to read data (e.g., data-out in RW UPIU message 220) from or write data (e.g., data-in in RW UPIU message 220) to UFS device 230. UFS device 230 then sends a corresponding response (e.g., rsp in RW UPIU message 220) to UFS host 210. In some examples, the read command can be a random read command or the write command can be a random write command.

In some implementations, UFS host 210 includes UFS driver 212 that drives UFS host controller 218. UFS host controller 218 is an interface engine of UFS host 210. UFS host controller 218 can handle an interrupt after receiving a response from UFS device 230, in order for the routine of interrupt processing 214 in UFS driver 212 to handle the response. Interrupt processing 214 is a routine within UFS driver 212 and can handle an interrupt controlled by interrupt controller 216. Interrupt controller 216 can control interrupts from UFS host controller 218. UFS transport protocol (UTP) transfer register 2181 in UFS host controller 218 can manage the flow of commands from UFS host 210 to UFS device 230 and the flow of data between UFS host 210 and UFS device 230.

In some implementations, UFS host controller 218 can handle a separate interrupt for each response received from UFS device 230. When the read or write command from UFS host 210 is a random read or a random write command, and the size of the data associated with the corresponding response from UFS device 230 is small, for example, less than or equal to 4 k bits, many interrupts may be handled by UFS host 210 within a short period of time, with each interrupt responsive to a response with associated data having small size.

In some implementations, instead of using a separate interrupt to handle each response received from UFS device 230, UFS host controller 218 can use UTP transfer interrupt aggregation control register 2182 to aggregate a number of received responses before using a single interrupt to handle the aggregated responses. Therefore, UTP transfer interrupt aggregation control register 2182 may mitigate interrupt overhead in UFS host 210 by reducing the rate at which interrupts are handled by UFS host controller 218.

In some implementations, UFS IP 232 is an interface engine of UFS device 230. UFS IP 232 can be either part of or independent of the controller of UFS device 230. UFS IP 232 can support the auto response of UTP response UPIU messages from UFS device 230. UFS IP 232 can also support the manual response of UTP response UPIU messages from UFS device 230 using the firmware of the controller of UFS device 230.

In some implementations, instead of sending a single response at a time to UFS host 210, UFS device 230 can use response aggregation control logic 234 to aggregate responses generated by UFS device 230 in response to commands received by UFS device 230 from UFS host 210, and then send the aggregated responses to UFS host 210 at a particular time. Different parameters, for example, maximum number of aggregated responses that can be sent from UFS device 230 to UFS host 210 or maximum time interval between consecutive time instants when the aggregated responses are sent from UFS device 230 to UFS host 210, can be set up to control when to send the aggregated responses. The maximum number of aggregated responses that can be sent from UFS device 230 to UFS host 210 can be set up using the interface "set_Wait_MaxCount" of response aggregation control logic 234, and the maximum time interval between consecutive time instants when the aggregated responses are sent from UFS device 230 to UFS host 210 can be set up using the interface "set_Wait_Timeout" of response aggregation control logic 234. The interface "set_StartStop" of response aggregation control logic 234 can be used to start or stop running response aggregation control logic 234. Response aggregation control logic 234 can be part of the firmware of the controller of UFS device 230. The received commands and the aggregated responses can be part of read/write (RW) UPIU messages 220 transmitted between UFS host 210 and UFS device 230. Sending aggregated multiple responses at a time from UFS device 230 to UFS host 210 may mitigate interrupt overhead in UFS host 210 by reducing the rate at which responses are sent by UFS device 230 to UFS host 210.

Figure 3:
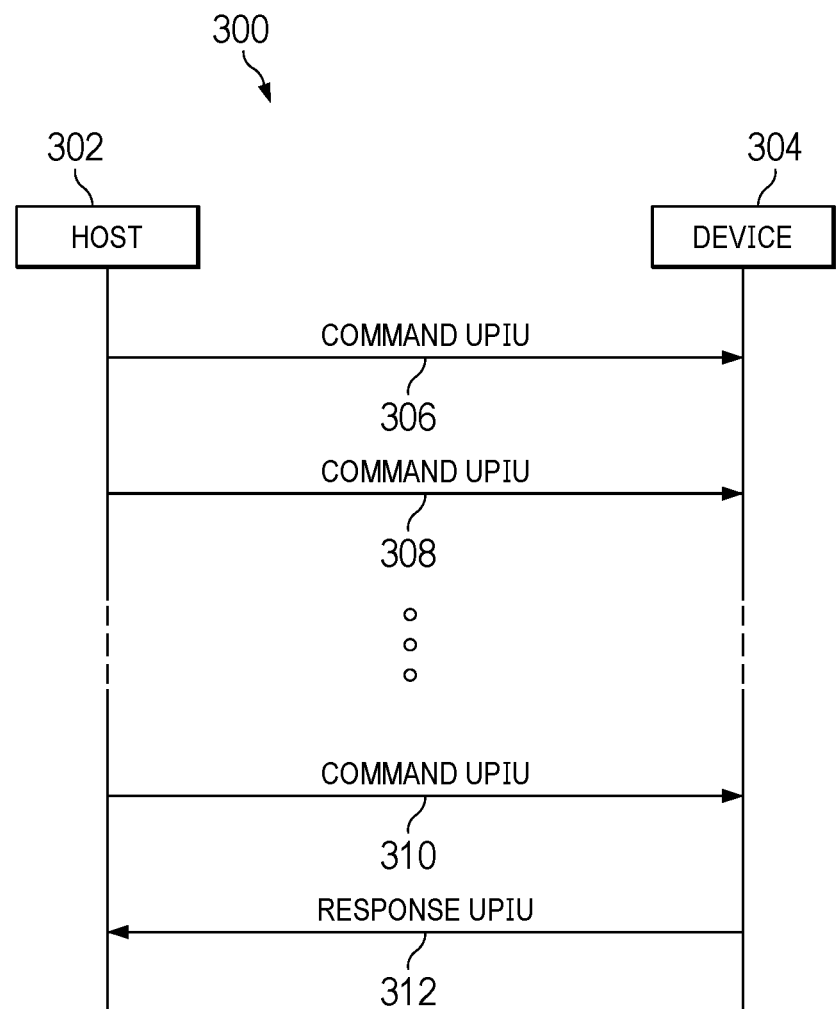
FIG. 3 illustrates an example of transactions between a host and a device, according to some aspects of the present disclosure.

FIG. 3 illustrates an example 300 of transactions between a host and a device. In some implementations, host 302 can send multiple commands, for example, command UPIU 306, 308, and 310 in UPIU data structure format, to device 304, before receiving responses from device 304. Examples of the multiple commands sent from host 302 to device 304 can include read or write commands. After receiving each of command UPIU 306, 308, and 310, device 304 can generate a respective response. But instead of sending each response to host 302 at a different time instant, device 304 can aggregate the respective responses and send them together at a time instant to host 302, for example, in response UPIU 312 in UPIU data structure format. Sending multiple responses together from device 304 to host 302 at a time instant instead of individually at different time instants may reduce the number of interrupts used by host 302 to handle the multiple responses from device 304, and consequently reduce the interrupt overhead in host 302 that is associated with handling the multiple responses from device 304. Command UPIU 306, 308, and 310 and response UPIU 312 can be part of RW UPIU message 220 in FIG. 2.

Figure 4:
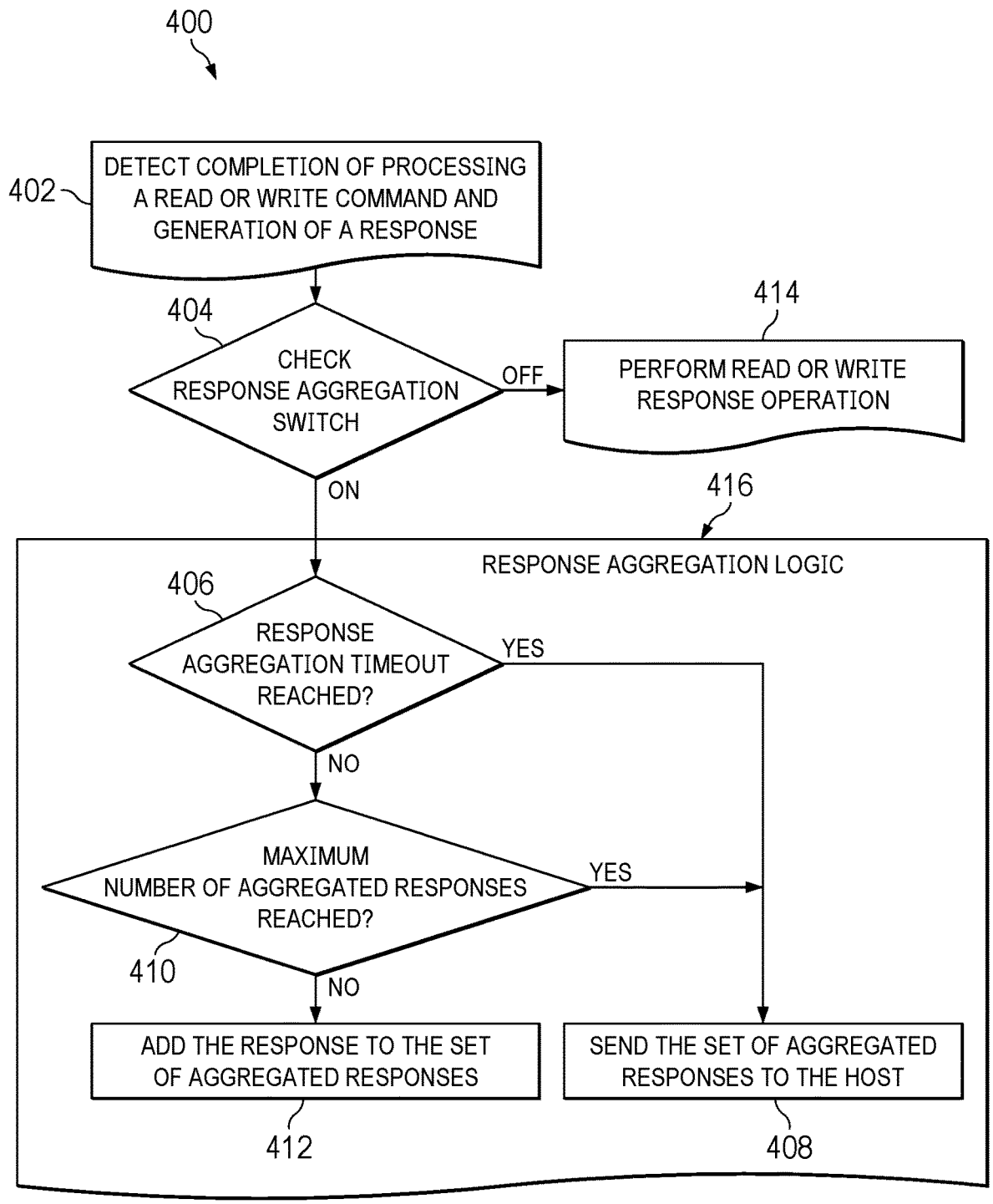
FIG. 4 illustrates an example workflow of controlling aggregated responses, according to some aspects of the present disclosure.

FIG. 4 illustrates an example workflow 400 of controlling aggregated responses. Workflow 400 can be implemented by response aggregation control logic 234 in FIG. 2 and can be performed by a device controller (e.g., controller 106). At 402, a device controller of a device (e.g., memory system 102 or UFS device 230) detects that the device has generated a corresponding response in response to a command, for example, a read command or a write command, received from a host.

At 404, the device controller checks the state of a response aggregation switch (e.g., response counting switch), which can be used to control whether to aggregate responses in the device. An example of the response aggregation switch is the interface "set_StartStop" of response aggregation control logic 234 in FIG. 2. If the state indicates that the response aggregation switch is on, then the device controller invokes response aggregation logic 416, which includes 406 to 412.

At 406, the device controller checks if a response aggregation timeout has reached. For example, if the time period from the last time multiple aggregated responses were sent to the host to the current time is longer than or equal to a predetermined time period, then at 408, the device controller sends to the host the responses aggregated since the last time multiple aggregated responses were sent to the host. If the time period from the last time multiple aggregated responses were sent to the host to the current time is less than the predetermined time period, then at 410, the device controller checks if a maximum number of aggregated responses has reached. For example, if a quantity of the responses aggregated since the last time multiple aggregated responses were sent to the host is greater than or equal to a predetermined threshold, then the device controller performs 408 by sending to the host the responses aggregated since the last time multiple aggregated responses were sent to the host. If the quantity of the responses aggregated since the last time multiple aggregated responses were sent to the host is less than the predetermined threshold, then at 412, the device controller increases the quantity of aggregated responses by one and adds the corresponding response to the set of responses aggregated since the last time multiple aggregated responses were sent to the host.

If at 404, the state of the response aggregation switch indicates that the response aggregation switch is off, then at 414, the device controller performs a read or write response operation by sending the corresponding response to the host.

In some implementations, the response aggregation switch can be set based on the types of commands sent from the host to the device, the rate at which the commands are sent from the host to the device, and/or the sizes of the data associated with the responses sent from the device to the host. For example, if during a specific period of time, the commands sent from the host to the device are write commands, the rate at which the commands are sent from the host to the device is higher than a preset threshold, and the size of the data associated with each response from the device is less than 4 k bits, then the response aggregation switch can be set to on in order to invoke response aggregation logic 416 to mitigate interrupt overhead in the host by reducing the rate at which responses are sent by the device to the host.

In some implementations, the device controller can swap 406 and 410 in response aggregation logic 416 while still mitigating interrupt overhead in the host by reducing the rate at which responses are sent by the device to the host.

In some implementations, the predetermined time period and the predetermined threshold may be determined according to the type of the command, the size of the data associated with the response, system requirements and/or user experience.

Figure 5:
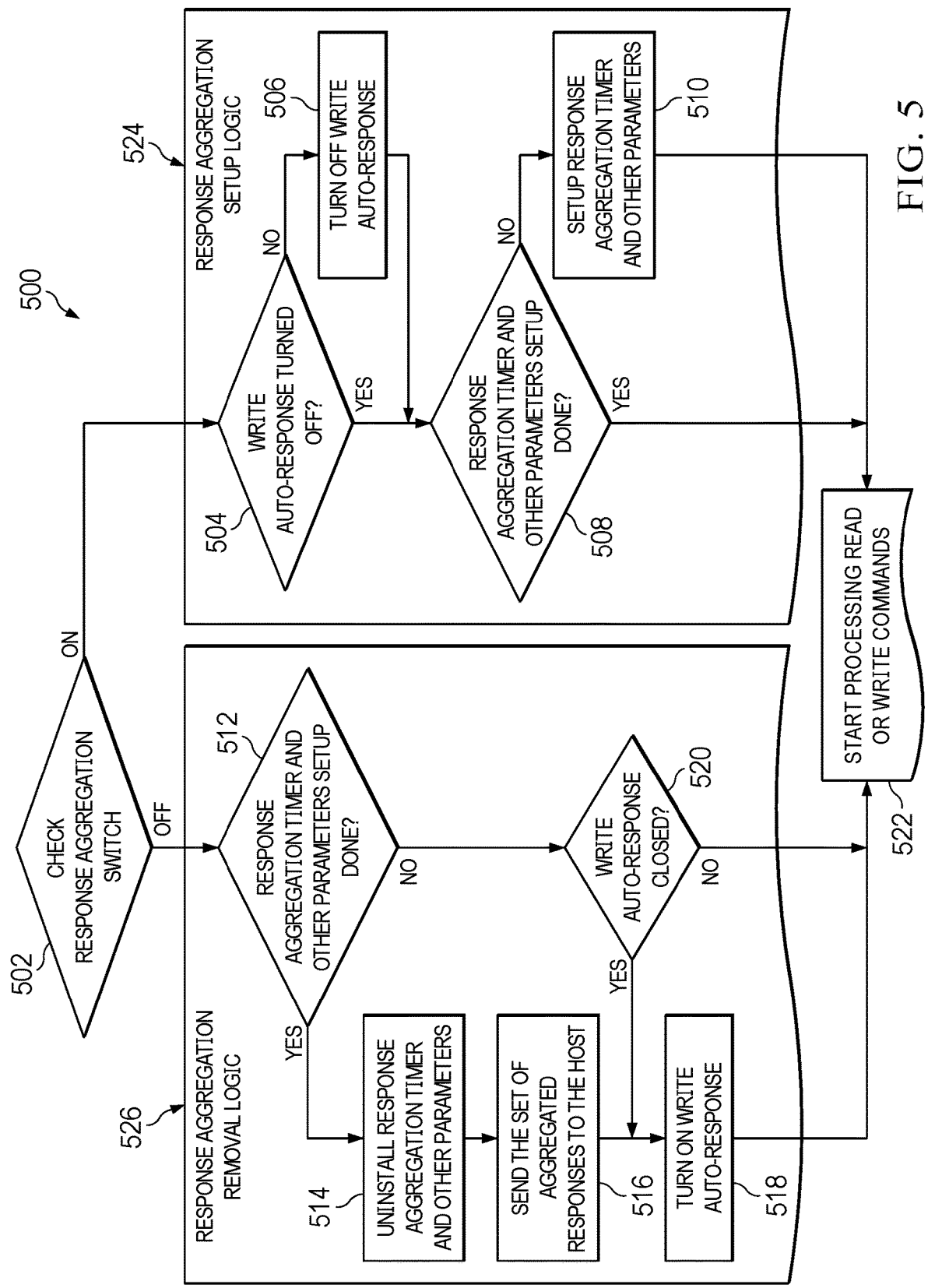
FIG. 5 illustrates an example workflow of handling parameters used in controlling aggregated responses, according to some aspects of the present disclosure.

FIG. 5 illustrates an example workflow 500 of handling parameters used in controlling aggregated responses. Example parameters can include the predetermined time period used in 406 and the predetermined threshold used in 410. Workflow 500 can be performed by a device controller and can be used for write transactions between a host and a device. The device controller can also perform workflow 500 for read transactions by replacing write auto-response with read auto-response.

At 502, a device controller of a device checks the state of a response aggregation switch (e.g., response counting switch), which can be used to control whether to set up response aggregation logic in the device. If the state indicates that the response aggregation switch is on, then the device controller invokes response aggregation setup logic 524, which includes 504 to 510.

At 504, the device controller checks if write auto-response is turned off. The device controller can use write auto-response to automatically send a response from the device to the host in response to a command from the host. If the write auto-response is not turned off, then at 506, the device controller turns off write auto-response so that response aggregation operation can be performed later. Then at 508, the device controller checks if a response aggregation timer (e.g., a timer counting the time duration since the last time multiple aggregated responses were sent to the host) and other parameters have been set up. The other parameters can include the predetermined time period used in 406 and the predetermined threshold used in 410.

If at 504, the device controller determines that the write auto-response is turned off, then the device controller performs 508 described above.

If at 508, the device controller determines that the response aggregation timer or other parameters have not been set up, then at 510, the device controller sets up the response aggregation timer or other parameters. At 522, the device controller performs workflow 400 in FIG. 4 to process read or write commands from the host.

If at 508, the device controller determines that the response aggregation timer and other parameters have been set up, then at 522, the device controller performs workflow 400 in FIG. 4 to process read or write commands from the host.

If at 502, the state of the response aggregation switch indicates that the response aggregation switch is off, then the device controller invokes response aggregation removal logic 526, which includes 512 to 520.

At 512, the device controller checks if a response aggregation timer (e.g., a timer counting the time duration since the last time multiple aggregated responses were sent to the host) and other parameters have been set up. The other parameters can include the predetermined time period used in 406 and the predetermined threshold used in 410.

If at 512, the device controller determines that the response aggregation timer or other parameters have not been set up, then at 520, the device controller checks if write auto-response is turned off. If the write auto-response is not turned off, then at 522, the device controller performs workflow 400 in FIG. 4 to process read or write commands from the host. If the write auto-response is turned off, then at 518, the device controller turns on the write auto-response. Then at 522, the device controller performs workflow 400 in FIG. 4 to process read or write commands from the host.

If at 512, the device controller determines that the response aggregation timer and other parameters have been set up, then at 514, the device controller uninstalls the response aggregation timer and other parameters. Next at 516, the device controller sends to the host the set of responses aggregated since the last time multiple aggregated responses were sent to the host. At 518, the device controller turns on the write auto-response. Then at 522, the device controller performs workflow 400 in FIG. 4 to process read or write commands from the host.

Figure 6:
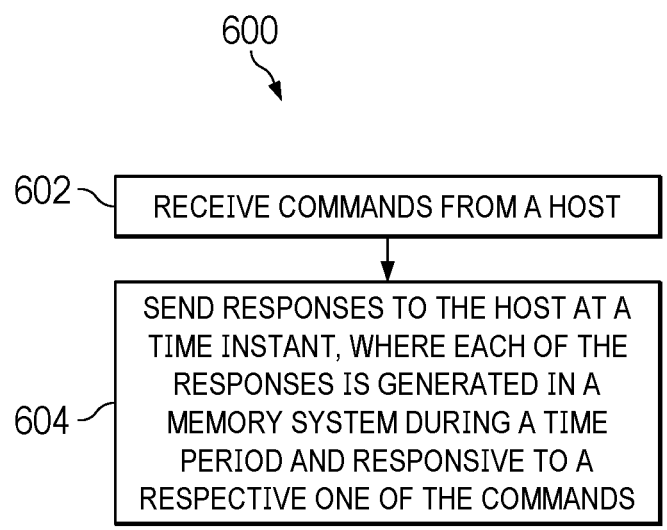
FIG. 6 illustrates an example of a flow chart of a method for aggregating responses from memory systems, according to some aspects of the present disclosure.

FIG. 6 illustrates an example 600 of a flow chart of a method for aggregating responses from memory systems, according to some aspects of the present disclosure. At 602, a controller of a memory system receives commands from a host.

At 604, the controller sends responses to the host at a time instant, where each of the responses is generated in a memory system during a time period and responsive to a respective one of the command.

Certain aspects of the subject matter described here can be implemented as a memory system. The memory system includes an interface and a controller. The interface is configured to perform operations including receiving commands from a host, and sending, to the host at a time instant, responses, where each of the responses is generated in the memory system during a time period and responsive to a respective one of the commands.

The memory system can include one or more of the following features.

In some implementations, the controller is coupled to the interface and configured to perform one or more operations including receiving, through the interface, the commands from the host, and generating the responses in response to receiving the commands.

In some implementations, the time instant for sending the responses is after the time period in response to determining that the time period is longer than or equal to a predetermined time period.

In some implementations, the time instant for sending the responses is during the time period in response to determining that a quantity of the responses generated is greater than or equal to a predetermined threshold.

In some implementations, the commands include random read or write commands, where a size of each of the random read or write commands is less than or equal to 4 kb.

In some implementations, the memory system includes a universal flash storage (UFS) device, where the UFS device includes the controller and a memory device.

In some implementations, a respective data structure of each read command in the commands includes a read command UFS protocol information unit (UPIU), a respective data structure of each write command in the commands includes a write command UPIU, a respective data structure of each read response in the responses includes a read response UPIU, and a respective data structure of each write response in the responses includes a write response UPIU.

Certain aspects of the subject matter described here can be implemented as a memory system. The memory system includes a memory device and a controller coupled to the memory device. The controller is configured to perform operations including receiving commands from a host, generating, during a time period, responses in response to receiving the commands, where each of the responses is responsive to a respective one of the commands, and sending, at a time instant, the generated responses to the host.

The memory system can include one or more of the following features.

In some implementations, the time instant for sending the responses is after the time period in response to determining that the time period is longer than or equal to a predetermined time period.

In some implementations, the time instant for sending the responses is during the time period in response to determining that a quantity of the responses generated is greater than or equal to a predetermined threshold.

In some implementations, the commands include random read or write commands, where a size of each of the random read or write commands is less than or equal to 4 kb.

In some implementations, the memory system includes a universal flash storage (UFS) device, where the UFS device includes the controller and the memory device.

In some implementations, a respective data structure of each read command in the commands includes a read command UFS protocol information unit (UPIU), a respective data structure of each write command in the commands includes a write command UPIU, a respective data structure of each read response in the responses includes a read response UPIU, and a respective data structure of each write response in the responses includes a write response UPIU.

In some implementations, the operations further include receiving a state of a response counting switch, receiving a predetermined threshold value, and receiving a predetermined time period value.

In some implementations, the operations further include determining that the received state of the response counting switch is on, determining that an auto-response switch is on, and in response to determining that the state of the response counting switch is on and that the auto-response switch is on, turning off the auto-response switch, setting the predetermined threshold to be the received predetermined threshold value, and setting the predetermined time period to be the received predetermined time period value.

Certain aspects of the subject matter described here can be implemented as a method. The method includes receiving commands from a host. Responses are sent to the host at a time instant, where each of the responses is generated in a memory system during a time period and responsive to a respective one of the commands.

The method can include one or more of the following features.

In some implementations, the time instant for sending the responses is after the time period in response to determining that the time period is longer than or equal to a predetermined time period.

In some implementations, the time instant for sending the responses is during the time period in response to determining that a quantity of the responses generated is greater than or equal to a predetermined threshold.

In some implementations, the commands include random read or write commands, where a size of each of the random read or write commands is less than or equal to 4 kb.

In some implementations, the memory system includes a universal flash storage (UFS) device, where the UFS device includes the controller and a memory device.

In some implementations, a respective data structure of each read command in the commands includes a read command UFS protocol information unit (UPIU), a respective data structure of each write command in the commands includes a write command UPIU, a respective data structure of each read response in the responses includes a read response UPIU, and a respective data structure of each write response in the responses includes a write response UPIU.

Certain aspects of the subject matter described here can be implemented as a non-transitory computer-readable storage medium storing one or more instructions executable by a computer system to perform operations including receiving commands from a host and by a memory system, generating, during a time period and by the memory system, responses in response to receiving the commands, where each of the responses is responsive to a respective one of the commands, and sending, at a time instant and by the memory system, the generated responses to the host.

The non-transitory computer-readable storage medium can include one or more of the following features.

In some implementations, the time instant for sending the responses is after the time period in response to determining that the time period is longer than or equal to a predetermined time period.

In some implementations, the time instant for sending the responses is during the time period in response to determining that a quantity of the responses generated is greater than or equal to a predetermined threshold.

In some implementations, the commands include random read or write commands, where a size of each of the random read or write commands is less than or equal to 4 kb.

In some implementations, the memory system includes a universal flash storage (UFS) device, where the UFS device includes the controller and the memory device.

In some implementations, a respective data structure of each read command in the commands includes a read command UFS protocol information unit (UPIU), a respective data structure of each write command in the commands includes a write command UPIU, a respective data structure of each read response in the responses includes a read response UPIU, and a respective data structure of each write response in the responses includes a write response UPIU.

In some implementations, the operations further include receiving a state of a response counting switch, receiving a predetermined threshold value, and receiving a predetermined time period value.

In some implementations, the operations further include determining that the received state of the response counting switch is on, determining that an auto-response switch is on, and in response to determining that the state of the response counting switch is on and that the auto-response switch is on, turning off the auto-response switch, setting the predetermined threshold to be the received predetermined threshold value, and setting the predetermined time period to be the received predetermined time period value.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A memory system, comprising:
an interface and a controller, wherein the interface is configured to perform operations comprising:
receiving, from a host, commands; and
sending, to the host at a time instant, responses, each of the responses is generated in the memory system during a time period and responsive to a respective one of the commands, wherein the memory system comprises a universal flash storage (UFS) device, and wherein the UFS device comprises the controller and a memory device, and
wherein a respective data structure of each read command in the commands comprises a read command UFS protocol information unit (UPIU), a respective data structure of each write command in the commands comprises a write command UPIU, a respective data structure of each read response in the responses comprises a read response UPIU, and a respective data structure of each write response in the responses comprises a write response UPIU.

2. The memory system according to claim 1, wherein the controller is coupled to the interface and configured to perform one or more operations comprising:
receiving, through the interface, the commands from the host; and
in response to receiving the commands, generating the responses.

3. The memory system according to claim 1, wherein the time instant for sending the responses is after the time period in response to determining that the time period is longer than or equal to a predetermined time period.

4. The memory system according to claim 1, wherein the time instant for sending the responses is during the time period in response to determining that a quantity of the responses generated is greater than or equal to a predetermined threshold.

5. The memory system according to claim 1, wherein the commands comprise random read or write commands, and wherein a size of each of the random read or write commands is less than or equal to 4 kb.

6. A memory system, comprising:
a memory device and a controller coupled to the memory device, wherein the controller is configured to perform operations comprising:
receiving, from a host, commands;
in response to receiving the commands, generating, during a time period, responses, each of the responses is responsive to a respective one of the commands; and
sending, at a time instant, the generated responses to the host, wherein the memory system comprises a universal flash storage (UFS) device, and wherein the UFS device comprises the controller and a memory device, and wherein a respective data structure of each read command in the commands comprises a read command UFS protocol information unit (UPIU), a respective data structure of each write command in the commands comprises a write command UPIU, a respective data structure of each read response in the responses comprises a read response UPIU, and a respective data structure of each write response in the responses comprises a write response UPIU.

7. The memory system according to claim 6, wherein the time instant for sending the responses is after the time period in response to determining that the time period is longer than or equal to a predetermined time period.

8. The memory system according to claim 6, wherein the time instant for sending the responses is during the time period in response to determining that a quantity of the responses generated is greater than or equal to a predetermined threshold.

9. The memory system according to claim 6, wherein the commands comprise random read or write commands, and wherein a size of each of the random read or write commands is less than or equal to 4 kb.

10. The memory system according to claim 8, wherein the operations further comprise:
receiving a state of a response counting switch;
receiving a predetermined threshold value; and
receiving a predetermined time period value.

11. The memory system according to claim 10, wherein the operations further comprise:
determining that the received state of the response counting switch is on;
determining that an auto-response switch is on; and
in response to determining that the state of the response counting switch is on and that the auto-response switch is on:
turning off the auto-response switch;
setting the predetermined threshold to be the received predetermined threshold value; and
setting the predetermined time period to be the received predetermined time period value.

12. A method of controlling a memory system, the method comprising:
receiving, from a host, commands; and
sending, to the host at a time instant, responses, each of the responses is generated in the memory system during a time period and responsive to a respective one of the commands, wherein the memory system comprises a universal flash storage (UFS) device, and wherein the UFS device comprises the controller and a memory device, and wherein a respective data structure of each read command in the commands comprises a read command UFS protocol information unit (UPIU), a respective data structure of each write command in the commands comprises a write command UPIU, a respective data structure of each read response in the responses comprises a read response UPIU, and a respective data structure of each write response in the responses comprises a write response UPIU.

13. The method according to claim 12, wherein the time instant for sending the responses is after the time period in response to determining that the time period is longer than or equal to a predetermined time period.

14. The method according to claim 12, wherein the time instant for sending the responses is during the time period in response to determining that a quantity of the responses generated is greater than or equal to a predetermined threshold.

15. The method according to claim 12, wherein the commands comprise random read or write commands, and wherein a size of each of the random read or write commands is less than or equal to 4 kb.

* * * * *